Aug. 4, 1970   C. M. STOKES   3,522,895
BODY LIFTING AND TRANSPORTING ASSEMBLY
Filed Dec. 21, 1967   3 Sheets-Sheet 1

Charlie M. Stokes
INVENTOR.

Aug. 4, 1970   C. M. STOKES   3,522,895
BODY LIFTING AND TRANSPORTING ASSEMBLY
Filed Dec. 21, 1967   3 Sheets-Sheet 2

Charlie M. Stokes
INVENTOR.

Aug. 4, 1970         C. M. STOKES         3,522,895

BODY LIFTING AND TRANSPORTING ASSEMBLY

Filed Dec. 21, 1967         3 Sheets-Sheet 3

Charlie M. Stokes
INVENTOR.

BY Clarence A. O'Brien
and Harvey B. Jackson
Attorneys

United States Patent Office 3,522,895
Patented Aug. 4, 1970

3,522,895
BODY LIFTING AND TRANSPORTING ASSEMBLY
Charlie M. Stokes, P.O. Box 1963,
Auburn, Ala. 36830
Filed Dec. 21, 1967, Ser. No. 692,422
Int. Cl. B65d 19/02
U.S. Cl. 214—621                    1 Claim

ABSTRACT OF THE DISCLOSURE

A body for a vehicle incorporating structural features that permit the body, the contents thereof and the vehicle chassis or vehicle chassis and transporter to be moved over the road together with mechanism for lifting the body which may be independent of the body or integrally attached thereto with the lifts contacting the body at particular areas thereof which have been adapted to be associated with the lifts.

---

The present invention generally relates to transportation of loads and particularly to a body having contents therein together with structural innovations incorporated therein to enable the body to be raised, lowered or moved by employing lifting devices associated with the structural innovations in the body.

In transporting articles employing vehicle bodies, the vehicle body usually is loaded at one point and driven or towed to another point where the articles are unloaded. During such time periods, the vehicular structure associated with the body is necessarily out of service inasmuch as the body is permanently attached to the vehicular or transporting structure. It is appreciated that in conventional semi-trailer constructions, the tractor portion of the unit may be detached from the trailer portion during the loading and unloading operation and in full trailer structures, the trailer may be detached from the towing vehicle during periods of loading and unloading. Nevertheless, the wheel assemblies normally supporting the trailer are permanently attached thereto and serve no useful purposes during the loading and unloading and also restrict the manner in which the load body can be handled due to the permanent attachment thereof. Even in present-day "piggy-back" operations, the wheel assemblies are left attached to the trailer unit when they are driven onto the railroad flat car so that when a destination is reached, the trailers may be towed off of the flat car and over the road to a desired location.

Accordingly, it is an object of the present invention to provide a body such as a vehicle body or the like which has a structural arrangement and structural innovations to enable an independent or integrally connected lift device to separate the load body from the vehicle chassis or wheel assemblies normally attached to the body thus enabling only the load body to be lifted, lowered or otherwise moved completely independent of the vehicle chassis and wheel assembly attached thereto or wheel assemblies which are attached directly to the load carrying body. This enables not only the vehicle chassis and wheel assemblies to be employed but also reduces the space required for the load bodies and also reduces the dead weight thereby enabling a corresponding increase in pay load. The body of a vehicle incorporating this invention includes parts or devices to be used for raising, lowering or moving the body and parts or devices for securing the body to the chassis of a propelling unit for the body or to propelling units and trailer or to any type of transporting device. Such parts or devices may be permanently attached or be detachable from the body or transporting unit and may be attached to the sides, ends, top, bottom or combination of these positions or points on the body.

Another object of the present invention is to provide a body having structural innovations for association with lifts used to lift the body which can be attached to or be independent of the body. The lifts contact the body at the parts or devices that are attached thereto for use with the lifts. The lifts may be in various structural embodies such as lift cylinders, jacks, cranes, lifting booms, straddle lifts, fork lifts, front end lifts or airborne lifts. A single type or various types and kinds of lifts can be used concurrently to handle the body with the points or devices used by the lift permitting the body and contents of the body to be raised or lowered or moved without damage to the body or to the body and contents thereof.

The vehicle body has dimensions, widths, heights, lengths and weight that will permit the body, the contents of the body and the chassis of the vehicle or vehicle chassis and transporter to be moved over public roads. The vehicle chassis can be composed of one unit for moving the body but the chassis may also be composed of a propelling unit, trailer wheels or transporter but the body of the present invention may also be placed on a non-motorized chassis or the body may be placed on or attached to a machine that contains equipment which will operate in conjunction with the body.

Still another object of the present invention is to provide a body for carrying a load incorporating structural innovations therein for association with a lift device which is relatively simple in construction, efficient in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
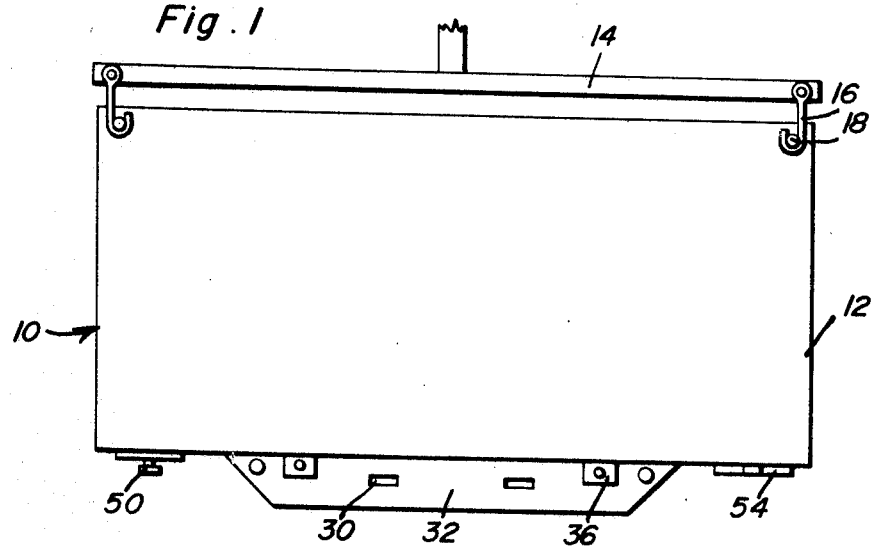
FIG. 1 is a side view of the body with parts thereof illustrated in use with a lift together with facilities for attaching or securing the body to a means for transporting the body.

Referring now specifically to the drawings, the body 10 illustrated in FIG. 1 is in the form of an enclosure 12 for use with various types of lifts. The only limitation on body configuration or shape is that which will permit the body to serve the purpose for which it is designed. FIG. 1 illustrates an overhead lift 14 having hook devices 16 associated with laterally extending pins 18 at the upper corners of the body 10 so that the overhead lift 14 may raise, lower or move the body 10 to a desired location.

Figure 2:
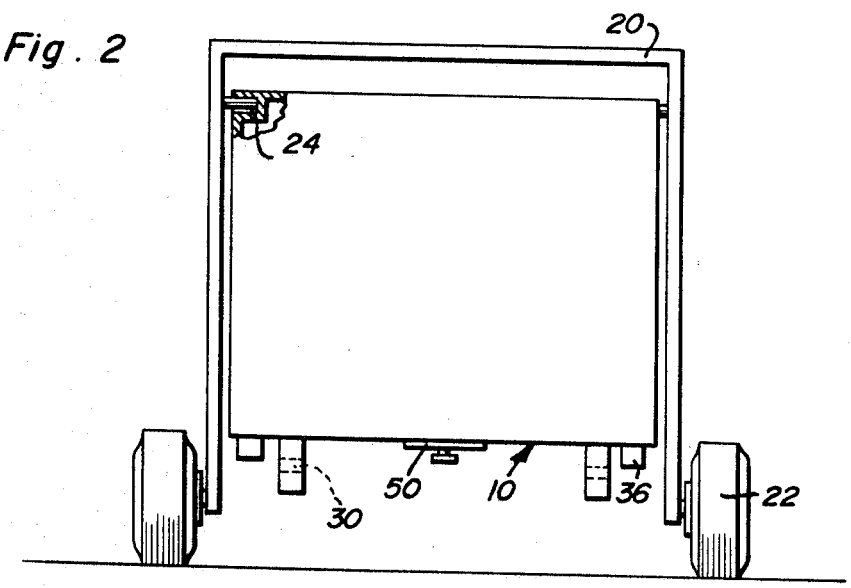
FIG. 2 is an end view of the body with a straddle carrier attached thereto.

FIG. 2 illustrates the body associated with a straddle lift device 20 having supporting wheels 22 in which the straddle device is capable of engaging the pins 18 which may be either permanently attached to or removably associated with sockets 24 in the body 10 thus enabling the pins 18 to be anchored to the body 10 or anchored to the lift device such as the straddle lift 20.

Figure 3:
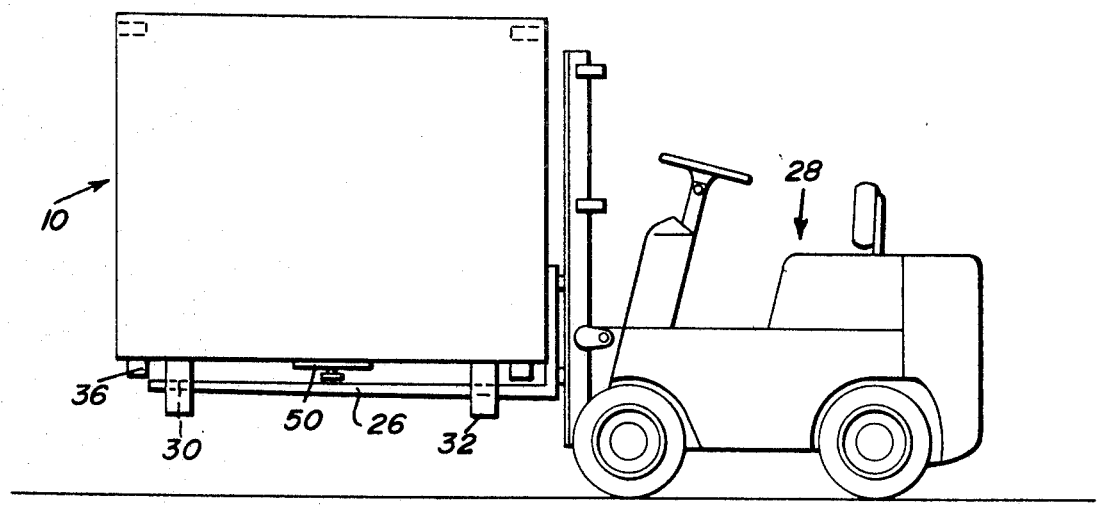
FIG. 3 is an end view of the body with a fork lift type of lift being used to handle the body.

FIG. 3 illustrates the body 10 being transported by the fork lifts 26 of a fork lift truck generally designated by the numeral 28. The fork lift 26 extends through apertures or passages 30 in frame members 32 on the load body 10.

Figure 4:
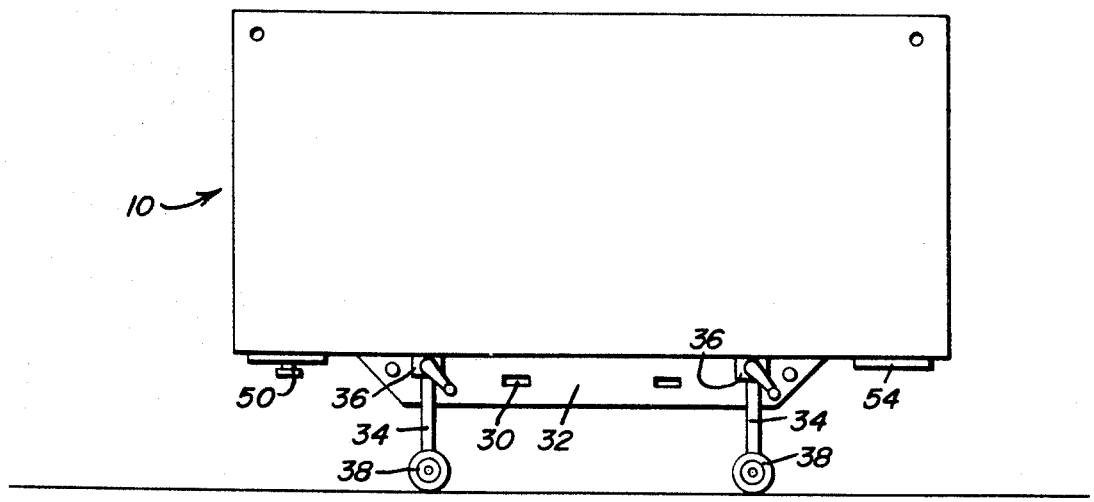
FIG. 4 is a side view of the body with retractable type lift being used to support the body.

FIG. 4 illustrates the load body 10 being supported by retracting lifts 34 that are attached to the body 10 by sockets or brackets 36 which are also attached at lifting points. The retracting lift devices 34 may be wheeled as at 38 and may be pivotal for swinging movement or extensible with any suitable mechanism being provided for extending and retracting the lifts 34.

Figure 5:
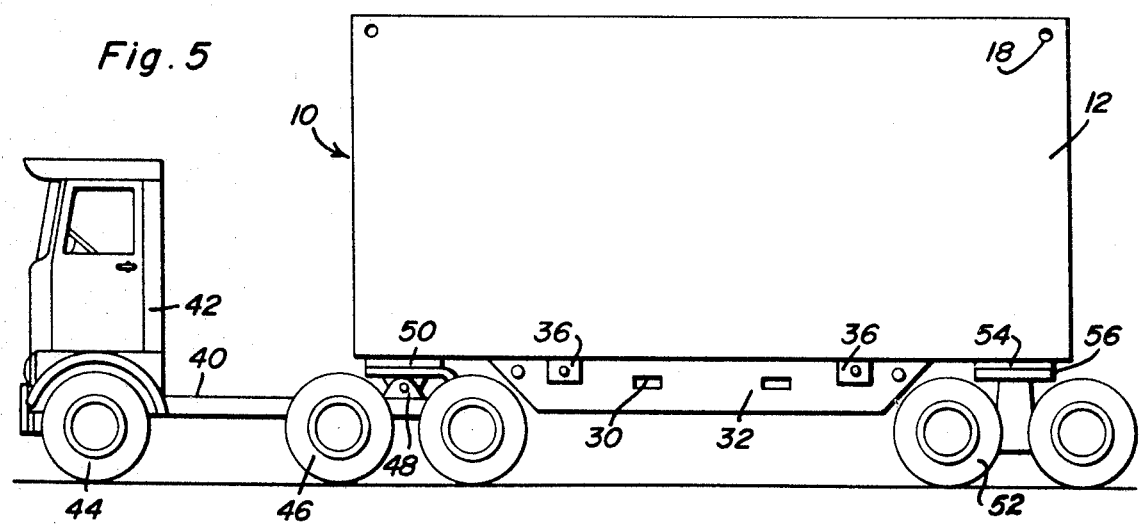
FIG. 5 is a side elevational view with the body attached to a towing vehicle chassis and rear transporter.

FIG. 5 illustrates the body 10 in which the front end thereof is attached to the chassis 40 of a towing vehicle 42 which includes steerable wheels 44 and driven traction wheels 46 with the attachment being accomplished by a suitable connection such as fifth wheel assembly 48 connected to the fifth wheel plate 50 provided on the undersurface of the front of the body 10 for articulate connection with the towing vehicle 42.

The rear of the body 10 in FIG. 5 is supported from a wheeled transporter unit 52 connected with an attaching plate 54 on the bottom of the rear of the body 10 with the transporter unit 52 including a corresponding attaching plate 56 to enable the load 10 to be towed over the road as a semi-trailer construction.

Figure 6:
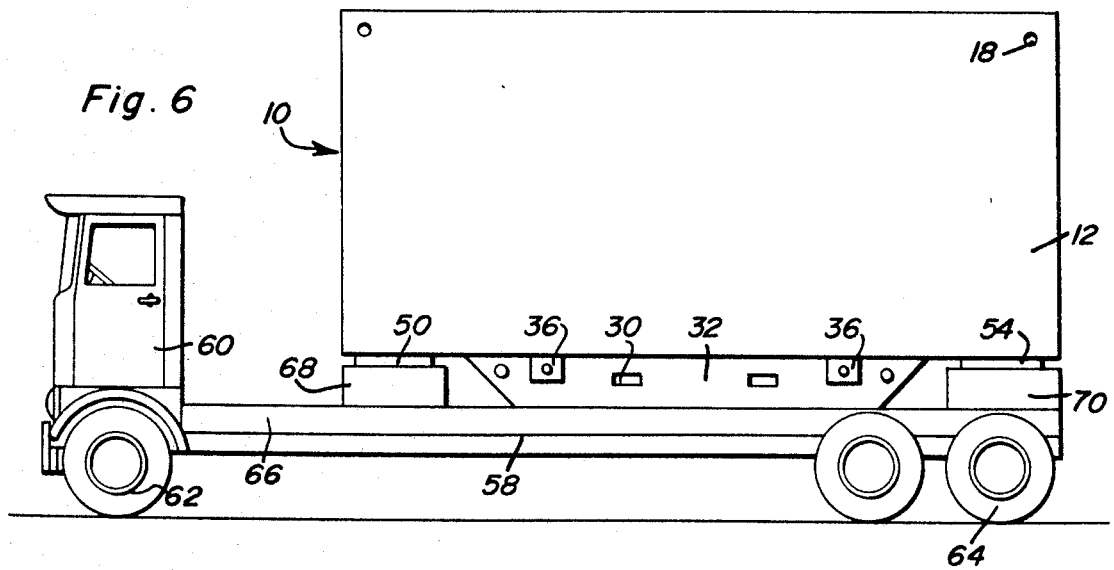
FIG. 6 is a side elevation of the body attached to a self-propelling machine.

FIG. 6 illustrates the body 10 supported directly on the chassis 58 of a self-propelling machine 60 having the usual front steerable wheels 62 and rear traction wheels 64. The frame members 32 on the body 10 may rest on the chassis 58 or a load carrying surface 66 provided thereon. The front of the load 10 is provided with a front body adapter 68 and the rear body adapter 70 is provided under the rear of the body 10 for retaining the same in supported position with the front adapter 68 being attached to the front attachment plate 50 and the rear adapter 70 being attached to the rear attachment plate 54.

Figure 7:
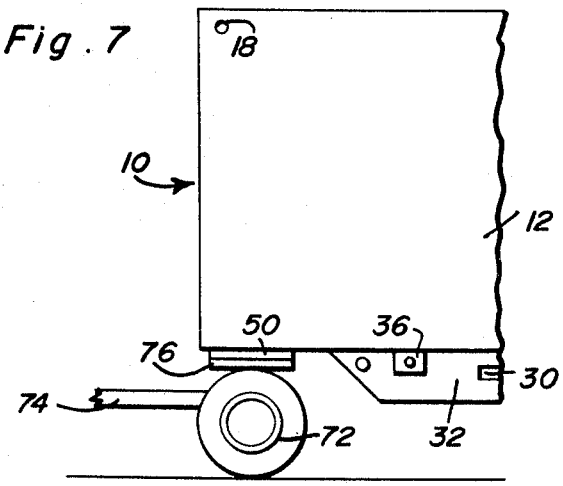
FIG. 7 is a fragmental side elevation of the body attached to a non-self-propelling machine.

FIG. 7 illustrates the body 10 attached to a non-propelling machine which includes a wheel assembly 72 and chassis 74 and a fifth wheel assembly 76 connected with the front attachment plate 50. The rear end of the body 10 is supported by a transporter unit (not shown in FIG. 7) which is the same as the transporter unit 52 illustrated in FIG. 5.

With the schematic illustrations in the drawings, it is pointed out that the body can be lifted from the pins 18 at the upper corner thereof which may be of any suitable construction to enable the corners to be connected with the lift device. Various types of sockets, brackets, loops or any attaching means may be provided for this purpose. Also, the frame members 32 are provided with structural innovations such as apertures 30 therethrough or the like to receive the lift forks 26 of a fork lift truck 28 or the like. The frame members 32 may have other attachment points associated therewith to enable the body to be engaged by other lift devices. The retracting lift brackets 36 may be oriented outwardly of or inwardly of the frames 32. The front of the body is provided with the attaching plate 50 which includes the pivot plate and depending pin constructing a portion of a fifth wheel assembly or if no articulate connection is provided, the attaching plate 50 provides connection with an adapter or other structure for supporting the front end of the body. The rear of the body has an attaching plate 54 in the form of a plate or bracket assembly which enables attachment of a transporter unit 52 or attachment of an adapter unit 70.

The purpose of the lifting points or attaching points on the body is to permit the body and contents thereof to be raised, lowered or moved by a lift without damage to the body and the contents thereof during these operations where suitable equipment is used and proper procedures are followed during these operations. The number and location of lifting points on the body may be varied as long as there are a sufficient number and proper location of lifting points to permit the body and contents of the body to be handled by the lift without damage to them. Other types of lifts may be used with the body other than the lifts schematically illustrated in the drawings and other method of attaching the lifts to the body may be employed. The lifting points, pivot plate or rear securing mechanism may be permanently attached to the body or may be detachable from the body as long as the method of attachment is such that they can perform the functions desired in an effective manner, as described herein.

The shape and configuration of the body is that which comes within the size, width, length, height and weight capacity of vehicles permitted to move over public roads with or without a special permit. The requirements for sizes and shapes of the parts and devices used by the lifts are that they be suitable for use with the lifts and the body can be handled by lifts using these parts or devices on the body without damage to the body and contents thereof. The body referred to herein includes that part of the vehicle where loads or passengers are carried and may include that part of the vehicle where operations are performed, things are stored, services are dispensed, events take place, living quarters for people, instruction is given or living space for animals and is not necessarily in the form of a receptacle or container for an article or articles such as a conventional package for various items.

The means for transporting the body may be attached to the sides, ends, top, bottom or a combination of these parts of the body. Other means of transporting the body over land, snow, ice, water, and/or through air or water may be attached to the body at the points on the body that are used to attach the body to the means used to transport the body over public roads. The points used to lift the body may also be used to secure the body for transporting or support thereof. The body can be used for its purposes when attached to or not attached to the means of transportation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A body for carrying a load comprising an enclosure, frame members disposed longitudinally of and projecting below the bottom of the enclosure, means on said body for engagement by overhead lift means, means adjacent each end of said body for releasable engagement with transporting means, said frame members including apertures associated therewith for receiving the lift forks of a fork lift device, and means on the bottom of the body for engagement by retractable lift devices, said means on said body or engagement by overhead lift means including projecting pins mounted at the upper side corners of the enclosure, said apertures in the frame members being longitudinally spaced along the frame members and being spaced below the bottom of the enclosure so that all lifting force of the lifting forks will be exerted on the frame members, said frame members being laterally spaced and disposed in parallel relation to each other adjacent the side edges of the enclosure but spaced inwardly therefrom, said means adjacent each end of the body for releasable engagement with transporting means including a plate structure mounted along the longitudinal center line of the bottom of the enclosure with the forward plate means including a depending pin for reception in a corresponding recess in a transporting means, said means engageable by retractable lift devices including a pair of longitudinally spaced brackets adjacent each side edge of the enclosure with the brackets being oriented outwardly of the frame members and in longitudinally spaced relation to each other for engagement by retractable lift devices whereby the body may be lifted, lowered and moved by the overhead lift means, the fork lift device, the transporting means and the retractable lift devices independently of each other thereby providing a body capable of independent movement, assembly into a towing vehicle to form an integral part of an over the road vehicle, mounting on the transporting means in the form of an over the road vehicle platform.

References Cited
UNITED STATES PATENTS

| | | | |
|---|---|---|---|
| 2,613,836 | 10/1952 | Newhall et al. | 220—1.5 |
| 2,703,659 | 3/1955 | Hutchins | 214—515 |
| 2,715,971 | 8/1955 | Cox | 220—1.5 X |
| 2,756,073 | 7/1956 | Bridge | 214—515 X |
| 2,787,971 | 4/1957 | Obes. | |
| 2,906,405 | 9/1959 | Erickson | 214—621 X |
| 2,972,430 | 2/1961 | Johnson | 220—1.5 |
| 3,014,604 | 12/1961 | Loomis. | |
| 3,083,852 | 4/1963 | Lidstrom. | |
| 3,211,313 | 10/1965 | Katz | 214—515 |
| 3,318,473 | 5/1967 | Jones et al. | 214—621 |

GERALD M. FORLENZA, Primary Examiner

R. J. SPAR, Assistant Examiner

U.S. Cl. X.R.

220—1.5